United States Patent [19]

Kurihara

[11] Patent Number: 4,679,904
[45] Date of Patent: Jul. 14, 1987

[54] LENS DRIVING DEVICE FOR AN OPTICAL PICKUP UNIT WITH SIMPLIFIED CONSTRUCTION

[75] Inventor: Toshihiko Kurihara, Tokorozawa, Japan

[73] Assignee: Pioneer Electronic Corporation, Tokyo, Japan

[21] Appl. No.: 726,597

[22] Filed: Apr. 23, 1985

[30] Foreign Application Priority Data

Apr. 23, 1984 [JP]  Japan .......................... 59-059718[U]

[51] Int. Cl.$^4$ .......................... G02B 26/08; G02B 7/02
[52] U.S. Cl. .................................... 350/255; 350/6.3; 369/45
[58] Field of Search .................. 350/255, 247, 6.3; 369/44, 45

[56] References Cited

U.S. PATENT DOCUMENTS

| | | | |
|---|---|---|---|
| 4,367,543 | 1/1983 | Araki et al. | 369/45 |
| 4,475,179 | 10/1984 | Geyer | 369/45 |
| 4,547,871 | 10/1985 | Sugiyama et al. | 369/45 |
| 4,554,653 | 11/1985 | Malissin et al. | 350/255 |
| 4,557,564 | 12/1985 | Van Rosmalen | 350/247 |
| 4,568,142 | 2/1986 | Iguma | 350/6.3 |

Primary Examiner—John K. Corbin
Assistant Examiner—Loha Ben
Attorney, Agent, or Firm—Schwartz, Jeffery, Schwaab, Mack, Blumenthal & Evans

[57] ABSTRACT

A lens driving device for an optical pickup unit includes a support structure for supporting an objective lens so that its optical axis is perpendicular to the surface of a recording medium while movements in the direction of the optical axis and in a direction perpendicular to the optical axis are permitted. The device further includes a driving structure for driving the objective lens in the direction of the optical axis and in the direction perpendicular to the optical axis respectively. The driving structure is made up of a magnetic circuit which forms a gap in which first and second coils connected to the objective lens are disposed so that driving forces in the direction of the optical axis and in the direction perpendicular to the optical axis are independently produced when suitable driving currents are supplied to the first and second coils.

3 Claims, 7 Drawing Figures

LENS DRIVING DEVICE FOR AN OPTICAL PICKUP UNIT WITH SIMPLIFIED CONSTRUCTION

BACKGROUND OF THE INVENTION

1. Field of the Invention

The present invention relates to a lens driving device for an optical pickup unit, and more specifically to a device having driving and supporting structure of an objective lens to be used in a pickup unit of a system for optically recording/reading information.

2. Description of Background Information

In systems for optically reading recorded information presently in wide use, a laser beam for reading information is focused on a recording track formed on the surface of a recording medium such as a video and/or audio disk by means of an optical pickup unit. The recorded information is recovered from the recording medium in terms of the change in the reflection of the irradiated reading laser beam. Due to the necessity that the reading laser beam is correctly focused on a recording surface of the recording medium irrespectively of fluctuation of the position of the recording surface, for instance caused by a curvature of the recording medium, the pickup unit is designed to include a support structure of an objective lens which allows the movement of the objective lens in a direction perpendicular to the recording surface within a relatively small amplitude.

Further, it is also necessary that the support structure allows lateral movement of the objective lens in a direction perpendicular to the direction of the recording track so that the reading laser beam always correctly follows the recording track irrespective of eccentricity of the recording track which may sometimes be present.

In order to meet such requirements, a lens driving device of an optical unit presently in use is constructed such that the so called focussing coil and tracking coils are fixed to the objective lens and commonly placed in magnetic circuits. However, in this type of conventional structure, there was a drawback that the size of the focussing coil necessarily becomes large due to the reason that a pole piece of the magnetic circuit having a through hole for permitting the reading laser beam is inserted into the focussing coil. This has been resulting in further disadvantages that the response characteristic or follow characteristic of a focus servo system as well as a tracking servo system provided to the information reading system is negatively affected. Further, it was unavoidable that the total size of the information reading system becomes large.

SUMMARY OF THE INVENTION

An object of the present invention is therefore to provide a lens driving device for an optical pickup unit which has a relatively small size so that good response or follow characteristics of the servo systems are assured and the total size of the information reading system is reduced.

According to the present invention, the lens driving device for an optical pickup unit includes a support mechanism of an objective lens, which support mechanism supports the objective lens so that an optical axis of the objective lens is perpendicular to the recording surface and the objective lens is movable in a direction of the optical axis and in a direction perpendicular to the optical axis. The lens driving device further includes a driving means for driving the objective lens in the direction of the optical axis and in the direction perpendicular to the optical axis, respectively. The driving means comprises a first coil whose central axis is substantially perpendicular to the optical axis of the objective lens, a second coil whose central axis is perpendicular to the optical axis of the objective lens, and at least a magnetic circuit arranged for surrounding the first and second coils, producing magnetic flux crossing the first and second coils.

According to another aspect of the invention, the driving means includes a single magnetic circuit which is arranged to surround the first and second coils, and which produces a magnetic flux crossing the first and second coils.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF A PREFERRED EMBODIMENTS

Figure 1:
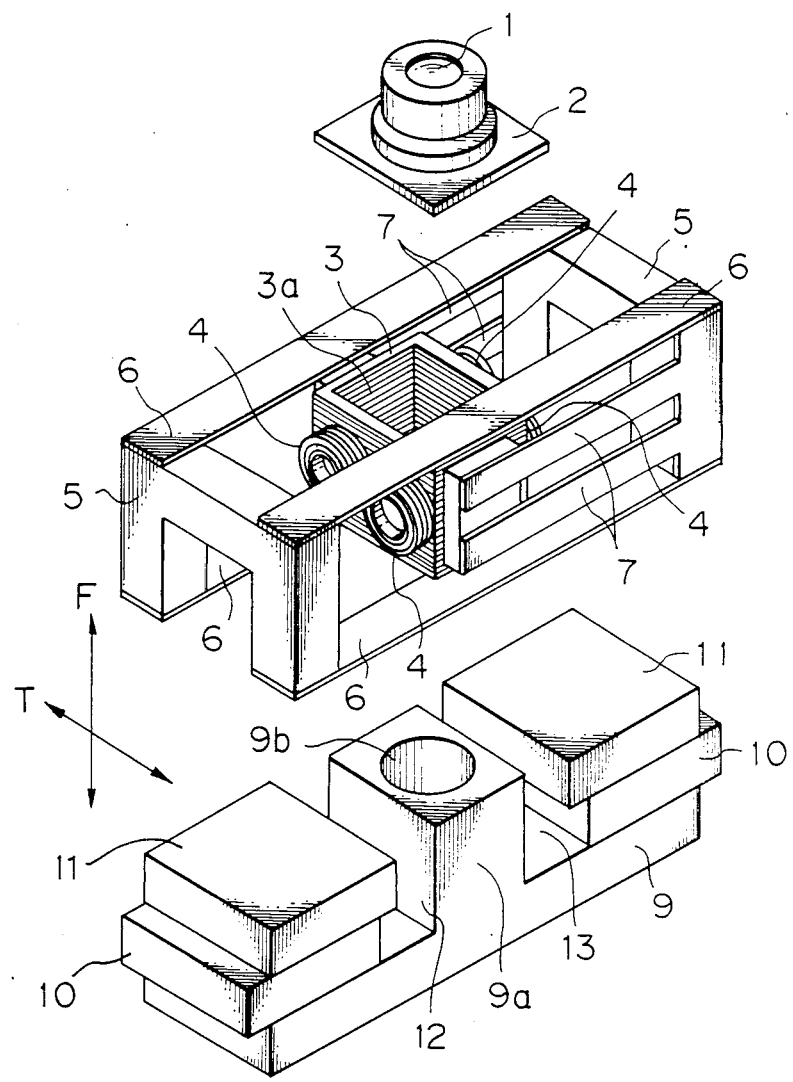
FIG. 1 is a perspective view of a lens driving device of an objective lens already proposed by the present applicant, especially showing an exploded view thereof.

Before entering into the explanation of the construction of the lens driving device for an optical pickup unit according to the present invention, reference is first made to FIG. 1 in which a presently used lens driving device is illustrated.

In FIG. 1, for allowing the movements of an objective lens 1 independently in two directions, a support structure as illustrated is utilized. Specifically, the objective lens 1 is mounted on a plate-like lens holder 2 having generally rectangular shape. A coil 3, that is, the so-called focusing coil 3 having a substantially rectangular cross-section in a direction perpendicular to a central axis thereof is fixed to a back face of the lens holder 2 in such a manner that the central axis of the focusing coil 3 is aligned with the optical axis of the objective lens 1. In addition to the focusing coil 3, four tracking coils 4 are fixed on the outer surface of the focusing coil 3. Each of the tracking coils 4 is previously wound into a circular shape and attached to the surface of the focusing coil 3. The focusing coil 3 and the tracking coils 4, and accordingly the objective lens 1 are supported by a structure made up of two pairs of leaf springs 7, two frames 5, and two pairs of leaf springs 6, so that the objective lens 1 is movable in the direction of the optical axis indicated by an arrow F and in the direction perpendicular to the optical axis and indicated by an arrow T, independently.

A magnetic circuit for driving the focusing coil 3 and the tracking coils 4 is also provided below the objective lens 1. This magnetic circuit is made up of a yoke 9, a pair of magnets 10, and a pair of yoke plates 11. The yoke 9 has a pole portion 9a so that a pair of magnetic gaps 12 and 13 are formed respectively between the pole portion 9a and one of the yoke plates 11, and between the pole portion 9a and the other one of the yoke plates 11. The focusing coil 3 and the tracking coils 4 are inserted into the magnetic gaps 12 and 13. In this state, the pole part 9a is inserted into an inner space 3a of the focusing coil 3. The pole part 9a is further provided with a through hole 9b for permitting the laser beam to pass therethrough.

The magnets 10 respectively generate strong and substantially parallel magnetic flux towards the pole part 9a facing each of the magnets 10 on both sides thereof. Since the focusing coil 3 and the tracking coils 4 are located in the magnetic gaps 12 and 13 in which the substantially parallel magnetic flux is formed, the central axes of the focusing coil 3 and the tracking coils 4 are crossing with each other in a plane perpendicular to the direction of the magnetic flux in the magnetic gaps 12 and 13.

By this arrangement, the objective lens 1 is moved along a direction F and the direction T when suitable drive currents are supplied to the focusing coil 3 and the tracking coils 4.

As mentioned before, conventional lens driving device having the above explained construction has a drawback that the size of the lens driving device becomes inevitably large because the pole part 9a is inserted into the inner space of the focuing coil 3 and the pole part 9a is provided with a through hole for the laser beam.

Figure 3:
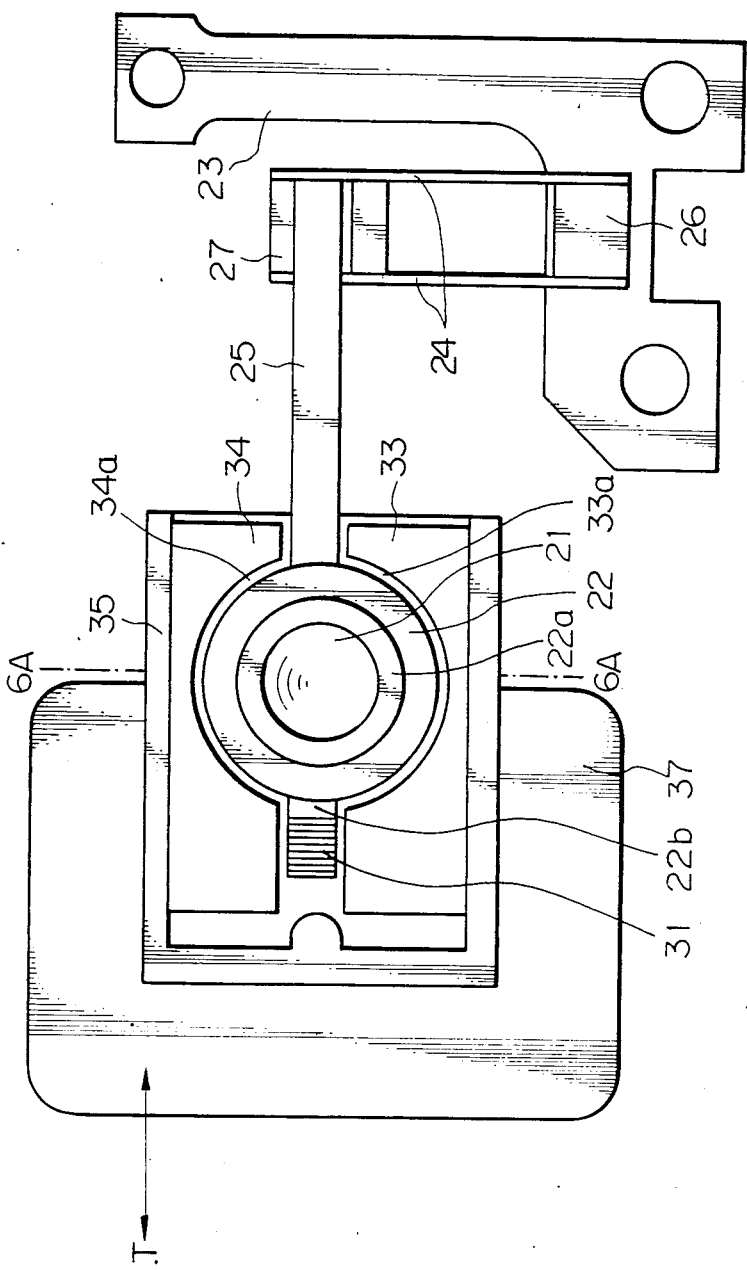
FIG. 3 is a plan view of the lens driving device shown in FIG. 2.
Figure 4:
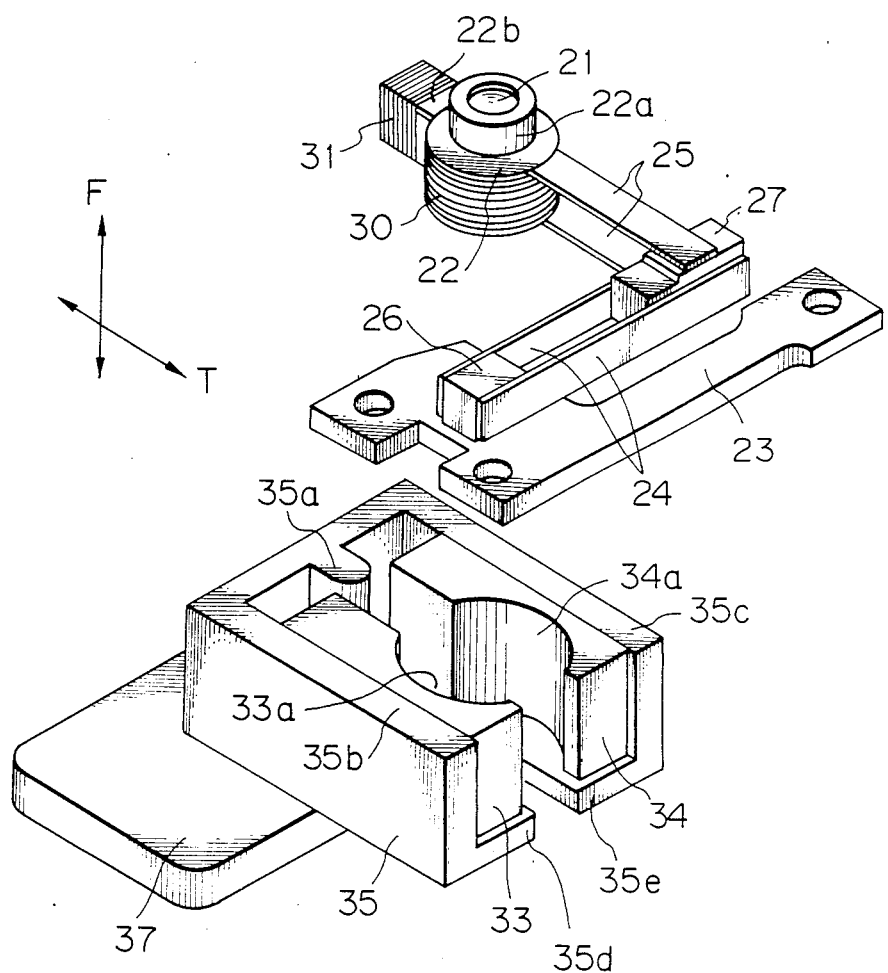
FIG. 4 is a general perspective view of the lens driving device shown in FIGS. 2 and 3.

A preferred embodiment of the lens driving device of an optical unit according to the present invention will be explained with reference to FIGS. 2 through 4 of the accompanying drawings.

Figure 2:
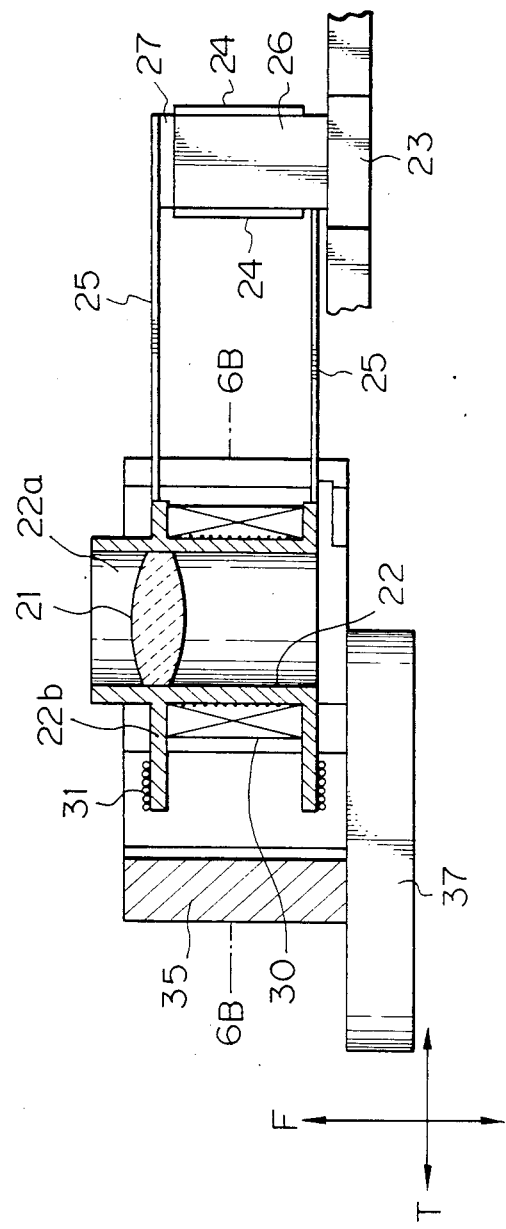
FIG. 2 is a cross-sectional view of an embodiment of the lens driving device for an optial pickup unit according to the present invention.

FIG. 2 shows a cross-sectional view of the preferred embodiment of the lens driving device.

As shown, the objective lens 21 is supported by a support structure which includes a substantially cylindrical bobbin 22, a base 23, two pairs of parallel leaf springs 24 and 25, and a pair of blocks 26 and 27. Specifically, the block 26 is fixed, at its bottom face, on the base 23 and first pair of parallel leaf springs 24 are attached, at first ends thereof, to the side faces of the block 26 with adhesive for example. The block 27 is supported by the first pair of parallel leaf springs 24 at second ends thereof. Since the second ends of the leaf springs 24 are attached to side faces of the block 27 in the similar manner as the first ends thereof, bending of the parallel leaf springs 24 allows substantially linear motion of the block 27 in the horizontal plane. A second pair of parallel leaf springs 25 are connected, at their first ends, to the upper and lower faces of the block 27 so that the direction of the leaf springs 25 is perpendicular to the direction of the leaf springs 24. The leaf springs 25 are also connected, at their second ends, to the bobbin 22, at upper and lower flange portions thereof. It will be understood that the bobbin 22 is supported, through the leaf springs 25 and the block 27 which in turn is supported by the block 26 via the leaf springs 24. The bobbin 22 is movable in the horizontal direction along with the block 27 and movable in vertial direction by bending of the parallel leaf springs 25.

The objective lens 21 is fitted in a cylindrical flange 22a of the bobbin 22 and maintained so that the optical axis thereof is perpendicular to the surface of the recording medium such as a digital audio disc. By the above mentioned motion of the support structure, the objective lens 21 is movable in a direction of the optical axis, that is, the direction of the focusing operation, (indicated by the arrow F) and in a direction (indicated by the arrow T) which is perpendicular to the optical axis, within a predetermined range respectively. Thus, the objective lens 21 is operated to focus the spot of the laser beam on the surface of the recording medium at a suitable position in accordance with the application of appropriate driving forces to the support structure.

The driving part of the device is constructed as follows. On the circumferential surface of the bobbin 22, a wire is coaxially wound a predetermined number of turns so as to form the focussing coil 30. The device further includes a generally rectangular sub bobbin 22b which projects from the bobbin 22 in a direction perpendicular to its axis and parallel to the tracking direction which is normal to the direction tangential with the recording track on the recording medium. On the sub bobbin 22b, a tracking coil 31 is wound so that the direction of the central axis thereof is parallel to the tracking direction, T. This tracking coil 31 may also be designated as a second coil and the focusing coil may also be designated as a first coil. The tracking coil 31, i.e., the second coil and the focusing coil 30, i.e., the first coil 30 are surrounded by a magnetic circuit consisting of a pair of magnets 33, 34 and a generally box-shaped yoke 35. The magnets 33 and 34 are secured by a base 37 via the yoke 35. The configuration of the yoke 35 is, as seen from the perspective view of FIG. 5, such that the horizontal cross-section is in the form of letter E, and each of leg portions 35b and 35c has an L-shaped vertical cross section. The magnets 33 and 34 are mounted respectively on horizontal projections 35d and 35e which form the lower part of the leg portions 35b and 35c respectively. Also, the yoke 35 has a vertical projection 35a which projects towards the gap between the magnets 33 and 34. In this arrangement, the focusing coil 30 is located within a cylindrical space slightly larger than the size of the focusing coil 30 and formed by two semicircular recesses 33a and 34a provided in the inner faces of the magnets 33 and 34 facing each other. The tracking coil 31 is located within a gap between the inner faces of the magnets 33 and 34. The focusing coil 30, tracking coil 31, and the magnetic circuit consisting of the magnets 33 and 34 and the yoke 35 altogether form the driving means for driving the objective lens 21 in the focusing direction and also in the tracking direction.

Figure 6A:
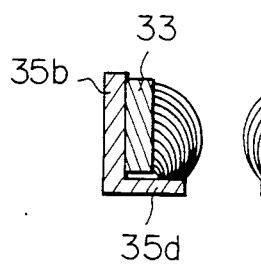
FIGS. 6A and 6B are vertical and horizontal cross sectional views of the magnetic circuit illustrated in FIGS. 2 through 4, showing the magnetic flux generated by the magnets 33 and 34 of the magnetic circuit.
Figure 6A:
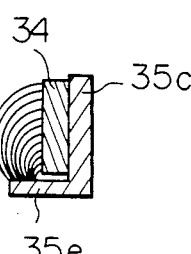
Figure 6B:
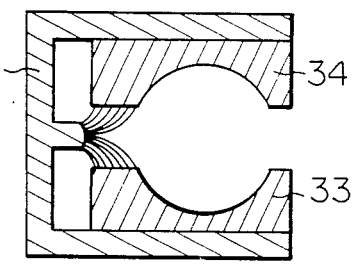

Specifically, the magnets 33 and 34 produce interlinkage magnetic flux which crosses the focusing coil 30 and the tracking coil 31. The magnetic flux produced by the mangets 33, 34 is typically illustrated in the cross sectional view of FIGS. 6A and 6B. When driving currents of suitable magnitude and direction are supplied to the focussing coil 30 and the tracking coil 31, driving forces for moving the objective lens 21 in the focusing direction and the tracking direction independently will be produced.

In view of the above, it will be appreciated that the magnetic circuit for driving the objective lens 21 in the focusing direction is also used as the magnetic circuit for moving the objective lens in the tracking direction. Thus, size of the lens driving structure is greatly reduced.

Figure 5:
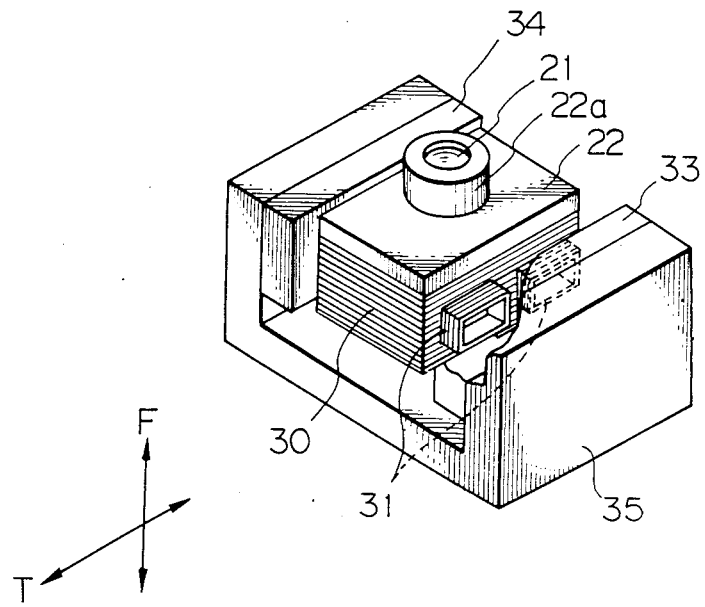
FIG. 5 is a general perspective view of a modification of the embodiment of lens driving device shown in FIGS. 2 through 3.

In FIG. 5, there is illustrated a modification of the above described preferred embodiment of the lens driving apparatus. As shown, this modification features that the bobbin 22 of the focussing coil 30 has generally rectangular form. In this type of arragnement using a rectangular bobbin, there is a great advantage that the fabrication and assembling of the magnetic circuit are greatly facilitated. As shown, the magnetic circuit of this modification consists of a pair of rectangular magnets 33, 34 and a yoke of generally U-shaped cross section.

In addition, the arrangement of FIG. 5 features that there are provided a pair of rectangular tracking coils 31 which are attached on the surface of the focusing coil 30 with adhesive for example. With this construction, the driving force in the direction indicated by the arrow T is generated by supplying suitable driving currents to the tracking coils 31. Since the support structure of the bobbin 22 is the same as the previous example, the explanation is omitted.

It will be appreciated from the foregoing, according to the present invention, by employing such an arrangement that the magnetic circuit is disposed to surround the focusing coil, the size of the focusing coil is by far reduced as compared with the conventional design in which a part of the magnetic circuit is inserted into the focusing coil. As a result, mass of the driven part of the apparatus including the objective lens and the focusing coil is greatly reduced. Therefore, there are advantages that the response or follow characteristic of the lens driving apparatus during the focus servo operation is improved and the total size of the lens driving apparatus is easily reduced. This is partly because, as mentioned before, a single magnetic circuit is utilized for moving the objective lens in the direction of the optical axis (focusing direction) as well as in the direction perpendicular thereto (tracking or tangential direction).

Above, specific embodiments of the lens driving apparatus have been described. However, it is to be noted that various changes and modifications may be made without departing from the spirit and scope of the invention. As an example, although the objective lens 21 is moved in the focusing direction and in the tracking direction in the above embodiments, it is possible to construct the apparatus so that the objective lens 21 is moved in the so-called tangential direction, that is, the direction tangential with the recording track on recording medium. Further, the supporting structure of the objective lens which allows the movement of the objective lens in predetermined directions is not limited to the above described structure using leaf springs, and there are many other structures which perform the equivalent function. In addition, the configurations of the focusing coil, tracking coil and the magnetic circuit are not limited to the above examples in which the focusing coil is wound around a cylindrical bobbin and the magnets of the mangetic circuit are provided with semicircular recesses which surround the focusing coil, or a rectangular focusing coil and a pair of rectangular magnets are used.

What is claimed is:

1. A lens driving device for an optical pickup unit, comprising:
    an objective lens for focusing a light beam on a recording surface of a recording medium;
    a support means for supporting said objective lens so that an optical axis of the objective lens is perpendicular to the surface of the recording medium, and movements of the objective lens in a direction of said optical axis and in a direction perpendicular to the optical axis independently are allowed; and
    a driving means for driving said objective lens in said direction of said optical axis and in said direction perpendicular to the optical axis, wherein said driving means includes a first coil connected to said objective lens and arranged so that a central axis thereof is substantially parallel to said optical axis, a second coil also connected to said objective lens and arranged so that a central axis thereof is substantially normal to the optical axis, and a magnetic circuit arranged to surround said first and second coils, and to form a single magnetic gap in which said first and second coils are received, for producing interlinkage magnetic flux crossing said first and second coils, thereby producing driving forces for moving said objective lens in the direction of said optical axis and in the direction perpendicular to the optical axis independently when suitable driving currents are supplied to said first and second coils respectively.

2. A lens driving device as set forth in claim 1 wherein said magnetic circuit has a gap portion in which said first and second coils are disposed.

3. A lens driving device as set forth in claim 2, wherein said magnetic circuit consists of a yoke having a generally E-shaped horizontal cross section and each leg portion of said yoke having a generally L-shaped cross section in a direction perpendicular to said E-shaped cross section, and a pair of magnets respectively mounted on said L-shaped leg portions of the yoke and arranged in parallel to each other to form a predetermined gap space therebetween, said magnets having semicircular recesses facing each other and forming a cylindrical space between said magnets, and wherein said focusing coil is made cylindrical and said tracking coil is attached to a side face of said focusing coil, said focusing coil is disposed in said cylindrical space and said tracking coil is disposed in said gap space between the magnets adjacent to a vertical projection of said yoke having generally E-shaped horizontal cross section, formed between said leg portions.

* * * * *